Patented Oct. 13, 1936

2,057,348

UNITED STATES PATENT OFFICE 2,057,348

REFRACTORY

Mahlon J. Rentschler, Willoughby, Ohio

No Drawing. Application March 9, 1936,
Serial No. 67,913

15 Claims.  (Cl. 106—9)

This invention relates to refractory bodies containing carbon and clay and method of producing them. Bodies according to the invention are especially desirable for use where the refractory contacts with molten metals, such as hot tops, linings for ladles, conduits for conveying molten metals in casting operations. Other and widely different uses are possible and will be readily apparent to those skilled in the various arts involving the use of refractories.

Objects of the invention are to produce refractory bodies having poor heat conducting properties, substantial freedom from cracking or spalling when subjected to violent temperature changes, such as would be caused by contact with molten metal, and having ample tensile and resistance strength, and high inertness to both carbon and clay attacking substances, while being low in cost and light in weight, and to provide at low cost a surface such as will prevent contact of molten metal and other carbon attacking substances with carbon content of the refractory body. A further object is to provide such surface by removal of the carbon from a surface portion of the refractory.

A still further object is to provide a body capable of being burned to produce such refractory body and a peculiarly effective method of forming the same.

Other and more limited objects will become apparent from the following description.

A refractory body embodying this invention may be produced by pugging together a mixture of clay and carbon of proper kind and in proper state of division with a proper proportion of water, compressing and forming the same to the desired shape, drying the resulting product and then burning it in oxidizing, neutral or reducing atmosphere. The burning may be done by heating in an oxidizing atmosphere at a high temperature so that the carbon is oxidized or burned out to a desired depth below the surface of the refractory so as to leave only the clay content of the refractory at its surface for contacting the molten metal or the like. The expression "oxidizing atmosphere" is used in the usual sense of "carbon consuming". In practice, I prefer to use a good grade of hard coke and a highly refractory fire clay of sufficient plasticity to give good coherence in pugging, pressing or extruding operations. The term coke is herein used in the ordinary sense of a cellular product produced by heating those grades of soft coal known as "coking coals". The limiting amount of carbon which can be employed is determined by the plasticity of the clay. If too much carbon be used the mixture becomes unworkable because of the diminished plasticity. And, it is to be noted that the use of crushed coke in the form of varied sized grains provides a grog which serves the purpose in this refractory that grog serves in the manufacture of ordinary fire brick, etc., and at the same time enhances the value of the refractory. The shrinkage of the carbon and clay mixture during drying and firing is less than that of the clay alone; and articles fabricated in this way are enabled to withstand sudden changes in temperature without cracking or spalling. Further, coke has the advantage over sand and other forms of grog in that it does not swell when heated. In fact, the granular coke particles in this refractory appear to shrink or be compressed when the refractory is heated, whereby to cushion the expansion of the remainder of the body which tends to offset the expansion of the clay thus producing a body of minimum shrinkage coefficient. In that portion of the refractory which is composed of a bonded mixture of finely divided carbon and finely divided clay, the clay and carbon afford mutual protection to each other in the case of, for example, a very common use of the refractory, i. e. in contact with molten steel masses containing a basic slag. The carbon protects the clay from reaction with the slag while the clay protects the carbon from oxidation and absorption by the steel or slag. Actual use has shown that the mixture is mutually protected to a remarkable extent as indicated altho the protection is not absolutely perfect.

I have found that it is better to crush the coke in some form of hammer mill than to crush it by rolling because the former operation gives the most angular product. A very satisfactory crushing is one which will result in a particle size for the coke about as follows:

| | Percent by weight |
|---|---|
| 4-mesh to 8-mesh | 47 |
| 8-mesh to 12-mesh | 35 |
| 12-mesh to dust | 18 |

These proportions may be varied considerably; all or merely a part of the coke may be used or other forms of finely divided carbon such as powdered calcined anthracite or hard coal etc.; but there should always be a portion of finely divided carbon and a portion of granular coke. The granular portion should not greatly exceed 4-mesh since the result might be an excessively pitted surface after the burning step. When 55 parts by weight of a finely divided plastic refractory fire clay are mixed with approximately 45 parts by weight of the crushed coke, prepared as above, the mixture moistened with water, pugged, formed and burned, I find that the resulting refractory body is substantially free from expansion or contractions when subjected to sudden changes in temperature, such for example, as occurs when a hot top is contacted by molten metal in pouring an ingot. Such body has a high crushing strength (25000 to 35000 lbs. per square inch) and, by rough determination, a coefficient of expansion of about 2.0 to 2.5 times $10^{-6}$ per degree F. It is to be understood that variations may be made from the conditions and proportions described, that different forms of carbon for the finely divided portion may be used, and that any clay which is suitable in the manufacture of refractories in general may be employed with more or less good results.

It should be pointed out that in such a mixture of crushed coke and clay the larger particles serve to give strength to the body while the smaller particles of coke or other carbon fill the interstices between the large particles and at the same time coat and are in turn coated by the finely divided clay so that a very close mixture results. Bodies prepared as above outlined may be dried very rapidly without showing any cracks whatever and in burning these bodies the temperature can be raised very rapidly without causing any cracks or checks in the finished bodies. While the drying of clay hot tops and similar refractory bodies made by present prevailing practice requires from one to two weeks, a hot top prepared by my method can be dried in from twenty-four to forty-eight hours. Care should be exercised in selecting carbon and clay having little, or no, pyrites or other easily fusible or fluxing ingredients as these may cause a pitting of the surface of the product or deformation of the body in the burning operation. Also the coke or carbon used should be substantially free from volatile matter so that the finished refractory body is practically non-porous and the clay residue left after the burning out of the carbon at the surface of the body is burned to a smooth finish. In burning this refractory in oxidizing atmosphere, the heat should be raised rapidly so that the firing may be completed without oxidizing the carbon to too great a depth below its surface. If the carbon is oxidized to too great a depth the physical strength of the body is lessened and its coefficient of expansion and contraction altered.

The ground clay and conditioned carbon are weighed or measured in the requisite proportions and then thoroughly mixed in approximately dry condition after which the necessary quantity of water is added and the mixing continued until the mass is uniform. The proportion of water used should be high enough that the mixture is extrudible, that is, can be caused to flow by application of sufficiently high pressure, yet low enough that, when shaped, it possesses sufficient rigidity to form well and to retain its shape without deformation from handling. A degree of rigidity too small to permit handling of the shaped object without deformation is herein termed "fluent". In determining the amount of water required it is necessary to take into consideration the initial adhering moisture contained in the clay and coke as well as the nature of the clay, some clays requiring more moisture than others to develop the requisite plasticity. In practice, using a good average grade of Ohio fireclay containing approximately ten (10) percent of adhering moisture and ground coke with less than two (2) percent of moisture, I have found the following proportions very satisfactory where a mixture of adequate rigidity is required to shape such refractories as hot tops, etc.:

|       | Pounds |
|-------|--------|
| Coke  | 360    |
| Clay  | 640    |
| Water | 93     |

When the mass has been thoroughly mixed, it is introduced into the pug mill (preferably one equipped with two shafts for better mixing) and the resulting plastic mass is ready for shaping. It is highly desirable that this plastic mass should be subjected to high pressure so as to force the mixed, finely divided particles into intimate contact and into the interstices between and into the surface follicles of the coke particles. I prefer to shape the objects by extrusion, since in that way compression and shaping are simultaneous, but good results can be had if the mix is subjected to high pressure and then shaped by tamping or in any desired manner. The water content should not be high enough to render the compression ineffective and this limitation upon the water content is to be understood as a connotation of the term "fluent".

When working this refractory material I have found it very desirable to remove entrained air as much as possible either by the use of rapid centrifugal whirling or by subjecting the mass to a vacuum before or while forming. I have found that, within the range of my experiments, the higher the pressure used in shaping, the slower will be the oxidation of the surface carbon during firing, so that articles adequately pressed may be fired to higher temperatures and for longer periods without excessive burning out or oxidation of the carbon at or near the surfaces than if formed under low pressure, and resulting in a refractory of great strength by reason of harder burning with a minimum loss of carbon. In actual practice I have observed an object shaped under a pressure of approximately 200 lbs. per square inch and fired to about 2450° F. under oxidizing conditions (in air) for thirty-six hours (from start to finish). The surface carbon was oxidized to an average depth of about ⅛th inch, whereas an object composed of the same mixture and shaped under only 20 pounds pressure to the square inch and fired to about 2300° F. in the same furnace under otherwise identical conditions, for 16 hours (from start to finish) was oxidized to an average depth of about ½ inch. Refractory bodies formed under higher pressures and consequently being able to withstand, in the firings, higher temperatures and longer periods of firing, without excessive burning out of surface carbon, are denser and physically stronger than those formed under lower pressures.

The pugged mass should be introduced into the shaping mechanism in a single piece otherwise laminations, flaws, crevices, seams or cracks are likely to result in the finished article. Especially is this true where excess pieces from previously pressed material, perhaps coated with oil films due to lubricant used in such pressing, are introduced into the shaping mold. Excess pressing scraps should be repugged before using. When shaping is properly done the surface of the objects formed is smooth and has a very thin surface skin which shows no seams, flaws or breaks after burning.

After the clay and coke have been pugged together and shaped, they may be dried at room temperature or in any suitable drying oven. When dried, they are burned by raising the temperature rapidly, to, e. g. from 1800° F. to 2800° F. under oxidizing conditions. If the furnace construction permits, the drying and firing may be carried out as one operation inasmuch as this material can be dried rapidly without cracking and where drying and firing are recited herein as separate steps this consolidation of the two is to be considered as included. The peak temperature is dependent upon the kind of clay used and the qualities desired in the finished product. It is to be noted that water smoking (firing at low temperature for long periods) is not necessary for the production of a satisfactory refractory when same is prepared as outlined above. The burning operation removes the surface carbon to a depth of ⅛" to ¼" or to a greater or less depth depending upon the pressure used in forming, the length of time, conditions of firing, kiln atmosphere, etc. and without substantially changing the gross volume of the refractory body. The conditions are adjusted to secure removal of the carbon to the desired depth which should be greater or less depending upon the thickness of the body, the strength required, and other requirements for the particular use to which the refractory body is to be put.

While I may form a very useful, heat hardened refractory, having most of the properties above described, by heating the mass in a reducing or neutral atmosphere or by packing in powdered coke for the burning, a very important feature is the removal of carbon from the surface of refractory bodies while leaving a clay surface capable of excluding molten metal or the like from contact with the carbon clay sub-surface portion. It is highly desirable in all cases where the presence of a small quantity of carbon would deleteriously affect the material to contact with the refractory, particularly where the material is molten metal which would absorb carbon.

This application is a continuation in part of my prior application Serial No. 3047, filed January 23, 1935, and of my application Serial No. 25479, filed June 7, 1935.

Having thus described my invention, what I claim is:

1. A refractory body having a portion composed of an intimate mixture of finely divided carbon, granular coke and finely divided clay and a surface portion composed of burned clay.

2. A refractory body having a portion composed of an intimate mixture of finely divided carbon, granular coke and a finely divided clay and a surface composed only of clay, the clay content per unit volume being substantially the same in both said portions.

3. A refractory body having a sub-surface portion composed of an intimate mixture of coke in a state of subdivision approximately as follows:

| | Per cent |
|---|---|
| 4-mesh to 8-mesh | 47 |
| 8-mesh to 12-mesh | 35 |
| 12-mesh to dust | 18 | and finely divided clay, said coke being present to the extent of approximately 45%, and a surface portion composed of burned clay.

4. A refractory body having a sub-surface portion composed of an intimate mixture of coke in a state of subdivision approximately as follows:

| | Per cent |
|---|---|
| 4-mesh to 8-mesh | 47 |
| 8-mesh to 12-mesh | 35 |
| 12-mesh to dust | 18 | and finely divided clay, said coke being present to the extent of approximately 45%, and a surface portion composed of burned clay, said surface portion containing approximately the same amount of clay per unit volume as the said sub-surface portion.

5. A refractory body having a portion composed of an intimate mixture of finely divided carbon, granular coke and finely divided clay, and a protective surface portion having the same composition as said first mentioned portion except being substantially free from carbon.

6. A refractory body having a portion composed of an intimate mixture of finely divided carbon, granular coke and finely divided clay, and a protective surface portion having the same composition as said first mentioned portion except being substantially free from carbon, the clay content per unit volume in said portions being substantially the same.

7. A strong, hard, refractory body having high compression strength and low coefficient of expansion as compared to fireclay refractories and having a major portion composed substantially of finely divided carbon, granular coke and finely divided fire clay, the constituents being thoroughly distributed throughout such portion and the clay particles being bonded with and filling the interstices between and the surface follicles of the coke particles, and being intimately associated and bonded with the fine carbon particles.

8. A highly compact, hard, bonded, refractory body having a major portion composed substantially of coke granules of varying sizes, finely divided carbon and finely divided fire clay, the constituents being thoroughly distributed throughout such portion and such body having a coefficient of thermal expansion low enough to enable it to withstand changes of temperature of the rate and magnitude caused by contacting the body at room temperature with molten iron in mass to remain molten and to withstand such temperature changes without substantial cracking or spalling.

9. A highly compact, hard, bonded, refractory body having a major portion composed substantially of granular coke, finely divided coke and finely divided fire clay, the constituents being thoroughly distributed throughout such portion and such body having a coefficient of thermal expansion low enough to enable it to withstand changes of temperature of the rate and magnitude caused by contacting the body at room temperature with molten iron in mass to remain molten and to withstand such temperature changes without substantial cracking or spalling.

10. A highly compact fireclay body having incorporated and thoroughly distributed through its mass non-volatile granular coke particles serving to cushion the expansion and contraction of the fireclay content under sudden and extreme temperature variations, the mass of said body other than said coke particles consisting essentially of an intimate, hard, bonded mixture of finely divided carbon and finely divided fireclay.

11. A hard, bonded refractory body composed of cellular coke granules of varying sizes, and having the interstices therebetween and the surface follicles thereof densely compacted with a close mixture of carbon and fireclay; whereby the carbon and clay content are mutually protected from rapid attack when the body is subjected to high heat in the presence of, for example, an agent which reacts with carbon and a basic slag, or the like.

12. A hard, bonded refractory body composed of cellular coke granules, and having the interstices therebetween and the surface follicles thereof densely compacted with a close mixture of carbon and fire clay; whereby the carbon and clay content are mutually protected from rapid attack when the body is subjected to high heat in the presence of, for example, an agent which reacts with carbon and a basic slag, or the like.

13. A highly compact, hard, bonded, refractory, body comprising a close, bonded mixture of finely divided carbon and finely divided fire clay having granular coke intimately admixed and bonded therewith, said body having a crushing strength of not less than 25000 lbs./sq. in. and a coefficient of expansion not substantially greater than 2.5 times $10^{-6}$ per degree F.

14. A highly compact, hard, bonded, refractory, body comprising a close, bonded mixture of finely divided carbon and finely divided fire clay having granular coke intimately admixed and bonded therewith, said body having the capability of withstanding alternate and repeated immersion in molten steel and cold water without cracking or spalling.

15. A highly compact, hard, bonded, refractory, body comprising a close, bonded mixture of finely divided carbon and finely divided fire clay having granular coke intimately admixed and bonded therewith, the mixture being sufficiently close that the finely divided carbon-clay matrix fills the surface follicles of the granular coke particles.

MAHLON J. RENTSCHLER.